United States Patent [19]

Sakairi et al.

[11] Patent Number: 5,294,232

[45] Date of Patent: Mar. 15, 1994

[54] PROCESS OF PREPARING SOLID POLYMER ELECTROLYTE TYPE FUEL CELL

[75] Inventors: Koichi Sakairi; Yumi Yamamoto, both of Hiratsuka, Japan

[73] Assignees: Tanaka Kikinzoku Kogyo K.K., Japan; Stonehart Associates Inc., Madison, Conn.; Masahiro Watanabe, Japan

[21] Appl. No.: 999,303

[22] Filed: Dec. 31, 1992

[30] Foreign Application Priority Data

Dec. 31, 1991 [JP] Japan .................. 3-359944

[51] Int. Cl.$^5$ .............................. H01M 4/88
[52] U.S. Cl. .................. 29/623.5; 429/42; 427/115; 502/101
[58] Field of Search .............. 429/42, 40, 192, 33; 502/101; 29/623.5; 427/115; 204/298.2

[56] References Cited

U.S. PATENT DOCUMENTS

| | | | |
|---|---|---|---|
| 4,383,010 | 5/1983 | Spaepen | 429/42 |
| 4,603,118 | 2/1986 | Staab | 502/101 |
| 4,767,683 | 8/1988 | Yamada et al. | 429/42 X |
| 4,816,357 | 3/1989 | Hope et al. | 429/192 |
| 5,171,644 | 12/1992 | Tsou et al. | 429/42 X |

Primary Examiner—Anthony Skapars
Attorney, Agent, or Firm—Klauber & Jackson

[57] ABSTRACT

Disclosed herein is a process of preparing a solid polymer electrolyte type fuel cell formed by combining a cathode current collector, a cathode containing cathode particles, an ion exchange membrane, an anode containing anode particles and an anode current collector characterized by comprising reducing a catalyst metal salt in an organic solution with the solid polymer electrolyte, depositing the reduced catalyst metal in the solid polymer electrolyte to form the cathode and/or the anode, interposing the cathode and/or the anode between the respective current collectors and the ion exchange membrane and pressing for assembling the fuel cell.

Also disclosed is the same process as above except that the support is present in the solid polymer electrolyte.

In the fuel cells prepared in accordance with the present invention, the catalyst metal always exists in the solid polymer electrolyte, and even if a cavity is formed in the solid polymer electrolyte, the catalyst metal is not exposed to the cavity. Accordingly, almost all the catalyst metals can be utilized to generate energy at the high efficiency.

2 Claims, 1 Drawing Sheet

PROCESS OF PREPARING SOLID POLYMER ELECTROLYTE TYPE FUEL CELL

BACKGROUND OF THE INVENTION

This invention relates to a process of preparing a solid polymer electrolyte type fuel cell employing an ionic conductive solid polymer diaphragm (membrane).

A solid polymer electrolyte type fuel cell has attracted the attention as a source of electricity of an electric automobile and a space craft because it is more compact and may generate higher current density compared with a phosphoric acid type fuel cell. Many proposals as to various electrode structures, methods of preparing catalysts, systems of constituting the fuel cells and the like have been made in this technical field. The electrode structure of a current fuel cell is mainly prepared by loading solid polymer electrolyte around carbon particles supported with a catalyst metal which are eventually present in the solid polymer electrolyte. This conventional electrode for a fuel cell is prepared by contacting the carbon particles previously supported with the catalyst metal with the solid polymer electrolyte.

According to this process of preparation, however, the carbon particles B of which all the surface is covered with the catalyst metal A exist in contact with the solid polymer electrolyte C as shown in FIG. 1, and if a cavity D is formed in the solid polymer electrolyte C, a catalyst metal A' supported on the surface of the carbon particles B facing the cavity D does not contact with the solid polymer electrolyte so as not to function as a catalyst so that the utilization efficiency of the catalyst metal cannot be elevated. Therefore, the voltage drop in the range of the current density practically employed is large and certain limitation to the current density practically employed is present for maintaining a fixed voltage.

In order to elevate the utilization rate of the catalyst metal, a method of directly supporting the catalyst metal on the solid polymer electrolyte membrane (ion exchange membrane) is attempted, but since a metal salt other than that combined with the ion exchange group of the membrane exists in the free state in the membrane, the former is likely to be deposited in the cavity of the membrane to become larger when it is reduced. Accordingly, it is difficult to finely deposit the catalyst metal of high concentration and is nearly impossible to support a fixed amount of the catalyst metal only on the surface of the membrane.

SUMMARY OF THE INVENTION

The present invention has been made to overcome the above drawbacks.

Accordingly, an object of the present invention is to provide a process of preparing a solid polymer electrolyte type fuel cell making the maximum use of the electrode characteristics Another object of the invention is to provide the process of preparing the solid polymer electrolyte type fuel cell containing a catalyst metal having a particle size of several tens Å deposited in the solid polymer electrolyte.

A further object of the present invention is to provide the process preparing the solid polymer electrolyte type fuel cell wherein almost all the catalyst metals exist in the solid polymer electrolyte so as not to be exposed to a cavity.

The present invention is a process of preparing a solid polymer electrolyte type fuel cell formed by combining a cathode current collector, a cathode containing cathode particles, an ion exchange membrane, an anode containing anode particles and an anode current collector characterized by comprising reducing a catalyst metal salt in an organic solution of the solid polymer electrolyte, depositing the reduced catalyst metal in the solid polymer electrolyte to form the cathode and/or the anode, interposing the cathode and/or the anode between the respective current collectors and the ion exchange membrane and pressing for assembling the fuel cell. A support for supporting the catalyst metal deposited may be present in the organic solution of the solid polymer electrolyte.

In the process of the present invention, the catalyst metal salt and, if necessary, the support are present in the organic solution such as alcohol of the solid polymer electrolyte and the said catalyst metal salt is reduced to the corresponding catalyst metal to be deposited in the solid polymer electrolyte. According to this process, the catalyst metal always exists in the solid polymer electrolyte, and even if a cavity is formed in the solid polymer electrolyte, the catalyst metal is not exposed to the cavity. Accordingly, almost all the catalyst metals can be utilized to generate energy at the high efficiency.

Especially, by reducing the catalyst metal salt in the organic solvent such as alcohol, the catalyst metal can be finely deposited.

DETAILED DESCRIPTION OF THE INVENTION

Figure 1:
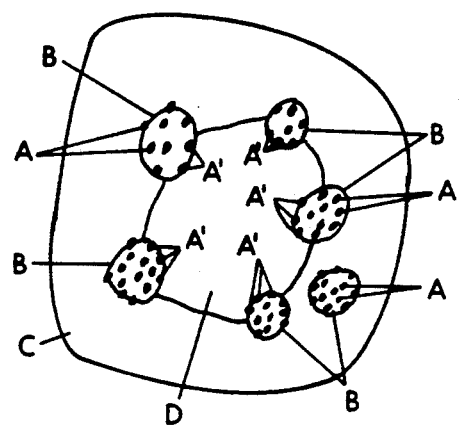
FIG. 1 is a schematic partially enlarged view of a conventional fine structure.

In the fuel cell having the solid polymer electrolyte (ion exchange membrane) which separates the anode and the cathode, a method as been attempted which comprises loading the solid polymer electrode having the properties the same as or similar to those of the material of the ion exchange membrane with catalyst metal which is a component constituting the cathode and the anode being in contact with the ion exchange membrane to obtain a three-phase boundary and ionic conductivity. Also in the fuel cell prepared in accordance with the present invention, the method of obtaining the three-phase boundary and the ionic conductivity by loading the solid polymer electrolyte with the catalyst metal is employed.

The catalyst metal employed in the fuel cell is not necessarily supported on a carbon support of the like. In the present invention, either of the following two methods may be employed. One method comprises directly depositing and dispersing the catalyst metal in the solid polymer electrolyte to constitute the cathode and the anode. The other comprises dispersing the support supported with the catalyst metal in the solid polymer electrolyte and depositing the reduced catalyst metal in the solid polymer electrolyte and on the surface of the support to constitute the cathode and the anode.

In case of direct dispersion of the catalyst metal into the solid polymer electrolyte, a certain amount of the catalyst metal salt is dissolved or suspended in the organic solution of the solid polymer electrolyte, adding a reducing agent thereto for reducing the catalyst metal salt to the corresponding catalyst metal which is deposited in the solid polymer electrolyte, removing the solvent of the organic solution by evaporation and molding the solid polymer electrolyte containing the dispersed catalyst metal to constitute the cathode and/or the anode for the fuel cell. In this method, the reduction of the catalyst metal is always performed int eh solid polymer electrolyte so that almost all the catalyst metals deposited exist in the solid polymer electrolyte, and when the fuel cell is assembled employing the solid polymer electrolyte, the catalyst metal function at the high utilization efficiency.

On the other hand, in case of dispersing the support into the solid polymer electrolyte, a certain amount of the catalyst metal salt and the support such as carbon particles are dissolved or suspended in the organic solution of the solid polymer electrolyte, adding a reducing agent thereto for reducing the catalyst metal salt to the corresponding catalyst metal which is deposited on the support, removing the solvent of the organic solution by evaporation or volatilization and molding the solid polymer electrolyte containing the dispersed catalyst metal to constitute the cathode and/or the anode for the fuel cell. Since, in the latter method, all the reduced catalyst metals exist in the solid polymer electrolyte, no catalyst metal reduced is supported on a non-contacted portion even if the support is not in contact with the solid polymer electrolyte so that almost all the catalyst metals exist in the solid polymer electrolyte, and when the fuel cell is assembled employing the solid polymer electrolyte, the catalyst metal functions at the high utilization efficiency.

The electrode prepared by the present invention is preferably employed as both of the cathode and the anode of the fuel cell, but the fuel cell may be assembled employing the above electrode as either of the cathode and the anode and a conventional electrode as the other.

The catalyst metal employed in the present invention may be any metal employed as an catalyst electrode for a conventional fuel cell, and especially a precious metal such as platinum is desirably employed.

The catalyst metal salt may be selected from the salts which can be converted into the catalyst metal by means of reduction and includes ordinary metal compounds and metal complexes.

An electroconductive support such as carbon may be preferable when the support is employed.

The solid polymer electrolyte in which the catalyst metal is dissolved or dispersed is not especially restricted, and polyacrylic acid, Nafion (trade name) solution (a polymer solution of perfluorocarbon sulfonic acid) or a polymer solution of perfluorocarbon carboxylic acid and the like are preferably employed. The solvent of the solid polymer electrolyte is not restricted so long as it is an organic solvent dissolving the solid polymer electrolyte, and an alcohol is preferably employed.

Such a reducing agent as hydrazine hydrochloride, hydrazine sulfate, sodium borohydride, ethanol, methanol, hydrazine hydrate and L-ascorbic acid may be employed individually or in combination thereof.

Carbon paper, a sheet prepared by sintering metal particles or the like is preferably employed as the above current collector. The current collector is porous, and the catalyst metal penetrates into the interior of the current collector to reduce the contact resistance therebetween to facilitate the inflow of the reaction gas and the discharge of the produced gas when the current collector is contacted and combined with the anode and the cathode containing the catalyst metal.

The ion exchange separating the anode and the cathode may also be any conventional membrane employed in a prior art fuel cell, and, for instance, Nafion (trade name) which is an ion exchange membrane having a perfluorocarbon sulfonic acid group or carboxylic acid group is preferably employed.

The fuel cell is constituted by combining the both current collectors, the cathode, the anode and the ion exchange membrane under pressure. The pressing operation may be carried out similar to a conventional one, and the hot-pressing is most suitable. All the above components are not required to be combined by a single pressing operation. For example, after the cathode current collector and the cathode, and the anode current collector and the anode are combined by means of cold-pressing, the ion exchange membrane is interposed therebetween to be combined by means of hot-pressing to constitute the fuel cell.

In the fuel cell thus prepared, almost all the catalyst metals are present in the solid polymer electrolyte having the ionic conductivity so that all the catalyst metals function as an electrode active component to obtain the maximum utilization efficiency.

Figure 2:
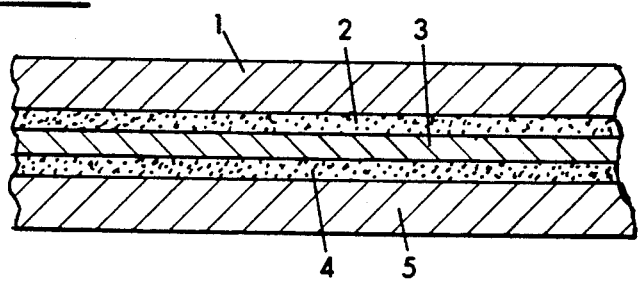
FIG. 2 is a schematic partial sectional view illustrating a five-layered fuel cell which may be manufactured in accordance with the process of the present invention.

A fuel cell in FIG. 2 is constituted by a cathode current collector 1, a cathode 2, an ion exchange membrane 3, an anode 4 and a anode current collector 5 piled in this turn from the top.

Figure 3:
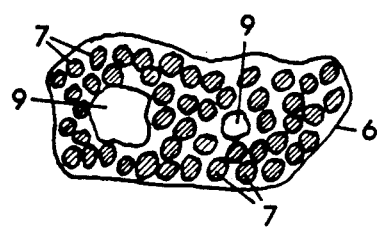
FIG. 3 is a schematic partially enlarged view illustrating the fine structure of the cathode and/or the anode of FIG. 2.
Figure 4:
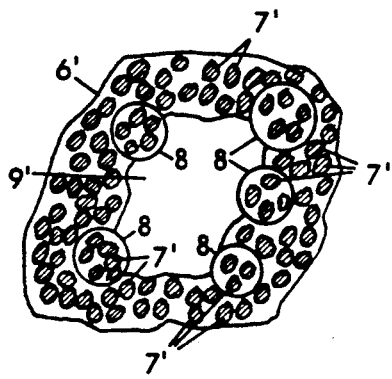
FIG. 4 is a schematic partially enlarged view illustrating another fine structure.

The cathode 2 and the anode 4 possess the fine structure as shown in FIG. 3 or 4 wherein the fine structure of FIG. 3 is composed of solid polymer electrolyte 6 and catalyst metals 7 and the fine structure of FIG. 4 is composed of solid polymer electrolyte 6', catalyst metals 7' and a support 8 supported with the catalyst metals 7'. Even if a cavity 9,9' is formed in the solid polymer electrolyte 6,6', the catalyst metals 7,7' are not exposed to the cavity 9,9' so that almost all the catalyst metals 7,7' are efficiently utilized.

EXAMPLES

Although Examples of the present invention for preparing a fuel cell will be described, these Examples do not restrict the present invention.

Example 1

1.77 g of platinumammine chloride [Pl(NU$_3$)$_4$]Cl$_2$ was dissolved in water of a four times volume and mixed with 19 g of a butanol solution of perfluorocarbon sulfonic acid (solid polymer electrolyte) followed by stirring at 60° C. for three hours. Then, hydrazine hydrate of a ten times amount of the platinum was added for reducing the platinumammine chloride. After the butanol was evaporated to make a solution of the solid polymer electrolyte having the concentration of 15 to 30%, the solution was applied to hydrophobically treated carbon paper functioning as a current collector at the rate of 0.3 mg Pl/cm$^2$ which was then completely dried at 80° C. to prepare a cathode and an anode.

The cathode and the anode were washed with a hydrochloric acid aqueous solution of 2 normal, and these electrodes were located with their platinum supporting surfaces facing to each other interposing an ion exchange membrane (Nafion) therebetween and hot-pressed at 130° C. to constitute a single cell employing no support as shown in FIG. 2

The particle size of the platinum of this cell was measured by a X-ray diffraction method to be about 15 Å.

The cell performance was evaluated by measuring a Tafel slope value while hydrogen and oxygen of 1 atm. were supplied to the anode and the cathode, respectively, and the anode gas was humidified at 90° C. and the cell temperature was maintained at 80° C. The Tafel slope value measured was 88 mV/log(mA/cm$^2$). The current density measured at 0.7 V was 390 mA/cm$^2$.

Example 2

The single cell shown in FIG. 2 was constituted in accordance with the procedures of Example 1 except that before the addition of the hydrazine hydrate, the same amount of carbon black as the platinum was dispersed in the solution.

The particle size of the platinum of this cell was measured by a X-ray diffraction method to be about 15 Å.

The Tafel slope value was measured under the same procedures as those of Example 1 to be 78 mV/log(mA/cm$^2$). The current density measured at 0.7 V was 514 mA/cm$^2$.

By employing chloroplatinic acid, 20% in weight of platinum was supported on carbon support. A cathode and an anode were prepared by loading solid polymer electrolyte on the catalyst, the amount of the solid polymer electrolyte being 90% in weight in respect to the platinum, with the carbon support. By employing the electrodes, the single cell shown in FIG. 2 was constituted.

The Tafel slope value was measured by the same procedures as those of Example 1 to be 110 mV/log(mA/cm$^2$). The current density measured at 0.7 V was 243 mA/cm$^2$.

As apparent from Examples and Comparative Example, the Tafel slope value of the fuel cell prepared in accordance with the present invention is small and its cell performance is excellent.

What is claimed is:

1. A process of preparing a solid polymer electrolyte fuel cell formed by combining a cathode current collector, a cathode containing cathode particles, an ion exchange membrane, an anode containing anode particles and an anode current collector which comprises the steps of reducing a catalyst metal salt in an organic solution of the polymer of the solid polymer electrolyte; depositing the reduced catalyst metal in the solid polymer electrolyte to form the cathode and/or the anode; interposing the cathode and/or the anode between the respective current collectors and the ion exchange membrane; and pressing the cathode and/or anode, respective current collectors and the ion exchange membrane, for assembling the fuel cell.

2. A process of preparing a solid polymer electrolyte fuel cell formed by combining a cathode current collector, a cathode containing cathode particles, an ion exchange membrane, an anode containing anode particles and an anode current collector which comprises the steps of reducing a catalyst metal salt in an organic solution of the polymer of the solid polymer electrolyte, containing a support; depositing the reduced catalyst metal in the solid polymer electrolyte and on the surface of the support to form the cathode and/or the anode; interposing the cathode and/or the anode between the respective current collectors and the ion exchange membrane; and pressing the cathode and/or the anode, respective current collectors and the ion exchange membrane, for assembling the fuel cell.

* * * * *